(12) United States Patent
Dunning

(10) Patent No.: US 7,720,852 B2
(45) Date of Patent: *May 18, 2010

(54) INFORMATION RETRIEVAL ENGINE

(75) Inventor: Ted E. Dunning, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 786 days.

This patent is subject to a terminal disclaimer.

(21) Appl. No.: 11/472,792

(22) Filed: Jun. 22, 2006

(65) Prior Publication Data
US 2006/0242193 A1 Oct. 26, 2006

Related U.S. Application Data

(63) Continuation of application No. 10/167,807, filed on Jun. 11, 2002, now Pat. No. 7,162,482, which is a continuation-in-part of application No. 09/848,982, filed on May 3, 2001, now Pat. No. 7,251,665.

(60) Provisional application No. 60/201,622, filed on May 3, 2000.

(51) Int. Cl.
G06F 17/30 (2006.01)

(52) U.S. Cl. ...................................... 707/750
(58) Field of Classification Search ....................... None
See application file for complete search history.

(56) References Cited

U.S. PATENT DOCUMENTS 3,568,156 A 3/1971 Thompson
3,947,825 A * 3/1976 Cassada .......................... 707/3
4,384,329 A 5/1983 Rosenbaum et al.
4,833,610 A 5/1989 Zamora
5,062,143 A 10/1991 Schmitt
5,182,708 A 1/1993 Ejiri
5,241,674 A 8/1993 Kuorsawa et al.
5,303,150 A 4/1994 Kameda
5,303,302 A 4/1994 Burrows
5,371,807 A 12/1994 Register et al.
5,392,212 A 2/1995 Geist (Continued)

FOREIGN PATENT DOCUMENTS

AU A53031/98 2/1997

(Continued)

OTHER PUBLICATIONS

Belkin, N.J., Oddy, R.N., Brooks, H.M., "The Journal of Documentation", vol. 38, No. 2, Jun. 1982, pp. 299-304.

(Continued)

Primary Examiner—Neveen Abel Jalil
Assistant Examiner—Bai D Vu
(74) Attorney, Agent, or Firm—James J. DeCarlo; Greenberg Traurig, LLP

(57) ABSTRACT

A system, method, and computer program product retrieve information associated with the signals. The information retrieval can be performed on a signal by quantizing the signal, forming words, and indexing based on weights of the words. The words are formed by grouping letters together to form a number of words within predetermined threshold values. The weights of the words are determined using a binomial log likelihood ratio analysis. The present invention may be applied to identification of an unknown song.

33 Claims, 10 Drawing Sheets

U.S. PATENT DOCUMENTS

| | | | |
|---|---|---|---|
| 5,404,505 A | 4/1995 | Levinson | |
| 5,418,951 A | 5/1995 | Damashek | |
| 5,497,488 A | 3/1996 | Akizawa et al. | |
| 5,499,046 A | 3/1996 | Schiller et al. | |
| 5,539,635 A | 7/1996 | Larson, Jr. | |
| 5,548,507 A * | 8/1996 | Martino et al. | 704/1 |
| 5,583,763 A | 12/1996 | Atcheson | |
| 5,592,511 A | 1/1997 | Schoen | |
| 5,608,622 A | 3/1997 | Church | |
| 5,616,876 A | 4/1997 | Cluts | |
| 5,661,787 A | 8/1997 | Pocock | |
| 5,675,786 A | 10/1997 | McKed | |
| 5,678,054 A | 10/1997 | Shibata | |
| 5,706,365 A * | 1/1998 | Rangarajan et al. | 707/102 |
| 5,708,709 A | 1/1998 | Rose | |
| 5,713,016 A | 1/1998 | Hill | |
| 5,721,827 A | 2/1998 | Logan | |
| 5,726,909 A | 3/1998 | Krikorian | |
| 5,740,134 A | 4/1998 | Peterson | |
| 5,751,672 A | 5/1998 | Yankowsky | |
| 5,754,938 A | 5/1998 | Herz et al. | |
| 5,758,257 A | 5/1998 | Herz | |
| 5,764,235 A | 6/1998 | Hunt | |
| 5,774,357 A | 6/1998 | Hoffberg et al. | |
| 5,790,423 A | 8/1998 | Lan et al. | |
| 5,790,935 A | 8/1998 | Payton | |
| 5,809,246 A | 9/1998 | Goldman | |
| 5,819,160 A | 10/1998 | Foladare | |
| 5,842,010 A | 11/1998 | Jain | |
| 5,862,220 A | 1/1999 | Perlman | |
| 5,862,339 A | 1/1999 | Bonnaure | |
| 5,864,868 A | 1/1999 | Contois | |
| 5,872,921 A | 2/1999 | Zahariev | |
| 5,881,234 A | 3/1999 | Schwab | |
| 5,883,986 A | 3/1999 | Kopec et al. | |
| 5,884,312 A | 3/1999 | Dustan | |
| 5,898,833 A | 4/1999 | Kidder | |
| 5,913,040 A | 6/1999 | Rakavy | |
| 5,913,041 A | 6/1999 | Ramanathan | |
| 5,926,207 A | 7/1999 | Vaughan | |
| 5,930,526 A | 7/1999 | Iverson | |
| 5,930,768 A | 7/1999 | Hooban | |
| 5,931,907 A | 8/1999 | Davies | |
| 5,941,951 A | 8/1999 | Day | |
| 5,945,988 A | 8/1999 | Williams | |
| 5,950,189 A | 9/1999 | Cohen | |
| 5,956,482 A | 9/1999 | Agraharam | |
| 5,960,430 A | 9/1999 | Haimowitz | |
| 5,969,283 A | 10/1999 | Looney | |
| 5,977,964 A | 11/1999 | Williams | |
| 5,983,176 A | 11/1999 | Hoffert | |
| 5,987,525 A | 11/1999 | Roberts | |
| 5,996,015 A | 11/1999 | Day | |
| 6,000,008 A | 12/1999 | Simcoe | |
| 6,009,382 A | 12/1999 | Martino et al. | |
| 6,012,098 A | 1/2000 | Bayeh | |
| 6,020,883 A | 2/2000 | Herz | |
| 6,021,203 A | 2/2000 | Douceur | |
| 6,026,398 A | 2/2000 | Brown et al. | |
| 6,026,439 A | 2/2000 | Chowdhury | |
| 6,029,195 A | 2/2000 | Herz | |
| 6,031,795 A | 2/2000 | Wehmeyer | |
| 6,031,797 A | 2/2000 | Van Ryzin | |
| 6,035,268 A | 3/2000 | Carus | |
| 6,038,527 A | 3/2000 | Renz | |
| 6,038,591 A | 3/2000 | Wolfe | |
| 6,047,251 A | 4/2000 | Pon et al. | |
| 6,047,268 A | 4/2000 | Bartoli | |
| 6,047,320 A | 4/2000 | Tezuka | |
| 6,047,327 A | 4/2000 | Tso | |
| 6,052,717 A | 4/2000 | Reynolds | |
| 6,061,680 A | 5/2000 | Scherf | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,097,719 A | 8/2000 | Benash | |
| 6,102,406 A | 8/2000 | Miles | |
| 6,105,022 A | 8/2000 | Takahashi et al. | |
| 6,131,082 A | 10/2000 | Hargrave, III et al. | |
| 6,134,532 A | 10/2000 | Lazarus et al. | |
| 6,138,142 A | 10/2000 | Linsk | |
| 6,154,773 A | 11/2000 | Roberts | |
| 6,161,132 A | 12/2000 | Roberts | |
| 6,161,139 A | 12/2000 | Win et al. | |
| 6,167,369 A * | 12/2000 | Schulze | 704/9 |
| 6,182,142 B1 | 1/2001 | Win | |
| 6,185,560 B1 | 2/2001 | Young et al. | |
| 6,192,340 B1 | 2/2001 | Abecassis | |
| 6,205,126 B1 | 3/2001 | Moon | |
| 6,222,980 B1 | 4/2001 | Asai | |
| 6,225,546 B1 * | 5/2001 | Kraft et al. | 84/609 |
| 6,230,192 B1 | 5/2001 | Roberts | |
| 6,230,207 B1 | 5/2001 | Roberts | |
| 6,240,408 B1 * | 5/2001 | Kaufman | 707/3 |
| 6,240,459 B1 | 5/2001 | Roberts | |
| 6,246,672 B1 | 6/2001 | Lumelsky | |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 | 8/2001 | de Campos | |
| 6,272,495 B1 | 8/2001 | Hetherington | |
| 6,282,548 B1 | 8/2001 | Burner | |
| 6,292,795 B1 | 9/2001 | Peters et al. | |
| 6,295,529 B1 * | 9/2001 | Corston-Oliver et al. | 707/3 |
| 6,298,446 B1 | 10/2001 | Schreiber | |
| 6,314,421 B1 | 11/2001 | Sharnoff | |
| 6,317,761 B1 | 11/2001 | Landsman | |
| 6,321,205 B1 | 11/2001 | Eder | |
| 6,321,221 B1 | 11/2001 | Bieganski | |
| 6,330,593 B1 | 12/2001 | Roberts | |
| 6,343,317 B1 | 1/2002 | Glorikian | |
| 6,353,849 B1 | 3/2002 | Linsk | |
| 6,370,315 B1 | 4/2002 | Mizuno | |
| 6,370,513 B1 | 4/2002 | Kolawa et al. | |
| 6,374,251 B1 * | 4/2002 | Fayyad et al. | 707/101 |
| 6,389,467 B1 | 5/2002 | Eyal | |
| 6,405,203 B1 | 6/2002 | Collart | |
| 6,430,539 B1 | 8/2002 | Lazarus et al. | |
| 6,434,535 B1 | 8/2002 | Kupka | |
| 6,438,579 B1 | 8/2002 | Hosken | |
| 6,487,598 B1 | 11/2002 | Valencia | |
| 6,490,553 B2 | 12/2002 | Van Thong | |
| 6,503,205 B2 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |
| 6,526,411 B1 | 2/2003 | Ward | |
| 6,532,477 B1 | 3/2003 | Tang | |
| 6,535,854 B2 | 3/2003 | Buchner | |
| 6,538,996 B1 | 3/2003 | West | |
| 6,557,026 B1 | 4/2003 | Stephens, Jr. | |
| 6,560,403 B1 | 5/2003 | Tanaka | |
| 6,560,704 B2 | 5/2003 | Dieterman | |
| 6,587,127 B1 | 7/2003 | Leeke | |
| 6,611,812 B2 | 8/2003 | Hurtado | |
| 6,611,813 B1 | 8/2003 | Bratton | |
| 6,614,914 B1 | 9/2003 | Rhoads et al. | |
| 6,615,208 B1 | 9/2003 | Behrens et al. | |
| 6,655,963 B1 | 12/2003 | Horvitz et al. | |
| 6,657,117 B2 | 12/2003 | Weare et al. | |
| 6,658,151 B2 | 12/2003 | Lee et al. | |
| 6,661,787 B1 | 12/2003 | O'Connell | |

|  |  |  |
|---|---|---|
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 | 10/2004 | Carpentier |
| 6,889,383 B1 | 5/2005 | Jarman |
| 6,925,441 B1 | 8/2005 | Jones, III |
| 6,952,523 B2 | 10/2005 | Tanaka |
| 2001/0005823 A1 | 6/2001 | Fischer |
| 2001/0042107 A1 | 11/2001 | Palm |
| 2001/0042109 A1 | 11/2001 | Bolas |
| 2001/0044855 A1 | 11/2001 | Vermeire |
| 2001/0052028 A1 | 12/2001 | Roberts |
| 2001/0055276 A1 | 12/2001 | Rogers |
| 2002/0002039 A1 | 1/2002 | Qureshey |
| 2002/0004839 A1 | 1/2002 | Wine |
| 2002/0007418 A1 | 1/2002 | Hegde |
| 2002/0010621 A1 | 1/2002 | Bell |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith |
| 2002/0035561 A1 | 3/2002 | Archer |
| 2002/0045717 A1 | 4/2002 | Grenda |
| 2002/0052898 A1* | 5/2002 | Schilit et al. ............... 707/530 |
| 2002/0056004 A1 | 5/2002 | Smith |
| 2002/0065857 A1 | 5/2002 | Michalewicz et al. |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0111912 A1 | 8/2002 | Hunter |
| 2002/0129123 A1 | 9/2002 | Johnson |
| 2002/0152204 A1 | 10/2002 | Ortega et al. |
| 2002/0175941 A1 | 11/2002 | Hand |
| 2003/0002608 A1 | 1/2003 | Glenn |
| 2003/0007507 A1 | 1/2003 | Rajwan et al. |
| 2003/0028796 A1 | 2/2003 | Roberts |
| 2003/0046283 A1 | 3/2003 | Roberts |
| 2003/0083871 A1 | 5/2003 | Foote |
| 2003/0093476 A1 | 5/2003 | Syed |
| 2003/0133453 A1 | 7/2003 | Makishima |
| 2003/0135513 A1 | 7/2003 | Quinn |
| 2003/0139989 A1 | 7/2003 | Churquina |
| 2003/0165200 A1 | 9/2003 | Pugel |
| 2003/0182139 A1 | 9/2003 | Harris |
| 2003/0190077 A1 | 10/2003 | Ross |
| 2003/0206558 A1 | 11/2003 | Parkkinen |
| 2005/0149759 A1 | 7/2005 | Vishwanath |

FOREIGN PATENT DOCUMENTS

|  |  |  |
|---|---|---|
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 1 050 833 A2 | 11/2000 |
| EP | 1236354 | 9/2002 |
| GB | 2306869 | 11/1995 |
| JP | 2001202368 | 7/2001 |
| JP | 2001521642 | 11/2001 |
| WO | WO 97/07467 | 2/1997 |
| WO | WO 98/25269 | 6/1998 |
| WO | WO 98/47080 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 01/33379 A1 | 10/2000 |
| WO | WO 01/35667 A1 | 11/2000 |
| WO | WO 01/54323 A2 | 1/2001 |
| WO | WO 01/73639 A1 | 10/2001 |
| WO | WO 02/42862 A2 | 5/2002 |
| WO | WO 02/065341 A2 | 8/2002 |
| WO | WO 02/065341 A3 | 8/2002 |
| WO | WO 03/012695 A2 | 2/2003 |

OTHER PUBLICATIONS de Marcken, Carl, "The Unsupervised Acquisition of a Lexicon from Continuous Speech", Massachusetts Institute of Technology Artificial Intelligence Laboratory; Center for Biological and Computational Learning, Department of Brain and Cognitive Sciences, A.I. Memo No. 1558 and C.B.C.L. Memo No. 129, Nov. 2001, pp. 1-27.

Griffiths, Alan, Luckhurst, H. Claire and Willett, Peter, "Using Interdocument Similarity Information in Document Retrieval Systems", Jul. 10, 1985, pp. 365-373.

Jones, K. Sparck, "Search Term Relevance Weighting Given Little Relevance Information", revised version received Jan. 14, 1979, pp. 329-338.

Jones, K. Sparck, "Readings in Information Retrieval", Morgan Kaufmann Publishers, Inc., 1997, pp. 25-110.

"Mel-Frequency Cepstral Analysis", [online][retrieved on Feb. 2, 2001] Retrieved from the Internet <URL: http://ccrma-www.stanford.edu/~unjung/mylec/mfcc.html>, pp. 1-3.

Robertson, S.E., "The Probability Ranking Principle in IR", received Jul. 12, 1977, pp. 281-286.

Salton, G., Wong, A., and Yang, C.S., "A Vector Space Model for Automatic Indexing", revised Mar. 1975, pp. 273-280.

Salton, Gerard and Buckley, Christopher, "Term-Weighting Approaches in Automatic Text Retrieval", accepted in final form Jan. 26, 1988, pp. 323-328.

Salton, Gerard and McGill, Michael J., "Introduction to Modern Information Retrieval", Computer Science Series, McGraw-Hill, Inc., 1983, pp. 1-23. 52-156, 199-302, 354-435.

van Rijsbergen, C.J., Information Retrieval, [online], 1979 [retrieved on Aug. 24, 2001] Retrieved from the Internet <URL: http://www.dcs.gla.ac.uk/Keith/Preface.html>.

Hayes, Conor et al., Smart Radio-A Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Hoffman, Thomas et al., Latent Class Models for Collaborative Filtering, Proceedings of the Sixteenth International Joint Conference on Artificial Intelligence, IJCAI 99, Stockholm, Sweden, Jul. 31-Aug. 6, 1999, Online! pp. 688-693, XP002279578. Retrieved from the Internet <URL:http://www.cs.brown.edu/{th/papers/HofmannPuzicha-IJCAI99.pdf>, retrieved on May 7, 2004.

Loeb, Shoshana, Architecting Personalized Delivery of Multimedia Information, Communications of the ACM, vol. 25, No. 12, Dec. 1992, pp. 39-50, XP002102709.

Nichols, David M. et al., Recommendation and Usage in the Digital Library, Technical Report Ref. CSEG/2/1997, Online! 1997, pp. 1-15, XP002279577, Retrieved from the Internet: <URL:ftp://ftp.comp.lancs.ac.uk/pub/reports/1997/CSEG.2.97.pdf>, retrieved on May 7, 2004.

Schafer, J. Ben et al., Recommender Systems in E-Commerce, Proceedings ACM Conference on Electronic Commerce, 1999, pp. 158-166, XP002199598.

U.S. Appl. No. 60/144,377, filed Jul. 16, 1999, Benjamin E. Hosken.
U.S. Appl. No. 60/165,726, filed Nov. 15, 1999, Sean Michnel Ward.
U.S. Appl. No. 60/165,727, filed Nov. 15, 1999, Sean Michnel Ward.
U.S. Appl. No. 60/166,039, filed Nov. 17, 1999, Sean Michnel Ward.

Charu C. Aggarwal, Cecilia Procopiuc, Joel L. Wolf, Philip S. Yu, and Jong Soo Park, "Fast Algorithm for Projected Clustering;", Proceedings of the ACM SIGMOD International Conference on Management of Data, 1999.

Cyril Cleverdon, "The Cranfield Tests on Index Language Devices," presented Apr. 27, 1967, pp. 47-59, Found in: Readings in Information Retrieval, Edited by Karen Sparck Jones and Peter Willett, Morgan Kaufmann Publishers, Inc., San Francisco, CA, 1997.

Cyril W. Cleverdon and J, Mills, "The Testing of Index Language Devices," presented Feb. 5, 1963, Chapter 3—Key Concepts, pp.

98-1 10, Found in: Readings in Information Retrieval, Edited by Karen Sparck Jones and Peter Willett, Morgan Kaufmann Publishers, Inc., San Francisco, CA, 1997.

Erling Wold, Thom Blum, Douglas Keislar, and James Wheaton, "Content-Based Classification, Search, and Retrieval of Audio," IEEE MultiMedia, Fall 1996.

Gerard Salton and M. E. Lesk, "Computer Evaluation of Indexing and Text Processing," pp. 60-84, Found in: Readings in Information Retrieval, Edited by Karen Sparck Jones and Peter Willett, Morgan Kaufmann Publishers, Inc ., San Francisco, CA, 1997.

Ian Goldberg, Steven D. Gribble, David Wagner, Eric A. Brewer "The Ninja Jukebox" Oct. 14, 1999.

Karen Sparck Jones and Peter Willett (Editors),Chapter 3—"Key Concepts," pp. 85-92 Found in: Readings in Information Retrieval, Morgan Kaufmann Publishers, Inc ., San Francisco, CA, 1997.

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc ., San Francisco, CA, 1997.

R. Brody, Ph.D., "The Conditions and Consequences of Profiling in Commercial and Governmental Settings," Technology and Society, 1998. ISTAS 98. Wiring the World: The Impact of Information Technology on Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *the whole document*.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc ., San Francisco, CA, 1997.

* cited by examiner

INFORMATION RETRIEVAL ENGINE

CROSS-REFERENCE TO RELATED APPLICATIONS

The present application is a continuation of U.S. patent application Ser. No. 10/167,807 filed Jun. 11, 2002 now U.S. Pat. No. 7,162,482 for "Information Retrieval Engine", the contents of which are incorporated herein by reference. U.S. patent application Ser. No. 10/167,807, is a continuation-in-part of U.S. patent application Ser. No. 09/848,982 for "Text Equivalencing Engine," filed May 3, 2001, now U.S. Pat. No. 7,251,665, the contents of which are incorporated herein by reference. U.S. patent application Ser. No. 09/848,982 for "Text Equivalencing Engine" claims priority from provisional U.S. Patent Application Ser. No. 60/201,622, for "Recommendation Engine," filed May 3, 2000, the contents of which are incorporated herein by reference.

BACKGROUND

A. Technical Field

The present invention is related to information retrieval, and more particularly, to retrieving information about a signal such as a music track or song, and creating a database of signals and the information retrieved about the signals.

B. Background of the Invention

In many contexts retrieving information about a sequence of unknown items is desirable. One such context is music. Some electronic copies of a piece of music include not only the music itself but also a tag (also known as meta-data). The tag includes information about the music such as the artist, the album name, and the track name. The tag can include any other information associated with the music entered by a listener.

However, some electronic copies of songs do not include the tag information. In particular, copies of songs downloaded from Napster or other sites where music can be downloaded only rarely include complete tag information. Additionally, as systems for recognizing music are fielded, it is likely that those providing copyrighted music without license will make efforts to evade any filtering system put into place. This has happened already with systems based on file name filtering. Thus, it is reasonable to expect slight variations of songs to be encountered in which the variations do not change the file substantially for the listener, but might make naïve comparison methods unreliable. Examples of such modifications include slight trimming of the beginning of a song, changes in overall volume, band-limiting and changes in equalization.

One way to replace missing tag information is to compare the waveforms of an unknown song (i.e. one that does include tag information) to those of known songs (i.e. songs for which tag information is known). When two waveforms match, tags can be transferred to unknown song. However, this method is inefficient in time and space because direct wave-form comparison is computationally expensive. Also, music files available over the Internet are usually compressed using a compression algorithm such as MP3. Compression makes direct comparison of audio waveforms impossible since there will, by nature, be significant differences between the original signal and the signal recovered from a lossily compressed version. These differences will not generally be audible, but they can be substantial in magnitude, especially when phase information is discarded by the compression algorithm.

An alternative method of determining tag information is to perform feature comparison rather than waveform comparison. Feature comparison is the comparison of analog features associated with the waveform such as correlating spectra or comparing extracted rhythm signatures. Feature comparison is also slow because it involves comparison of analog features that occur over time. Thus, comparison using these analog features requires exhaustive comparison and time-alignment. Moreover, many analog features are not invariant under common transformations such as translation in time, volume scaling and small changes in equalization.

What is needed is a system and method of determining tag information for an unknown music track that avoids the above-described limitations and disadvantages. What is further needed is a system and method that leads to accurate retrieval of tag information for a compressed, trimmed piece of music of limited bandwidth. What is further needed is a system and method that is efficient in time and memory space. Currently available systems require an exhaustive search and expensive comparisons to each exemplar. Both the exhaustive search and the expensive comparison operations should be avoided if possible.

SUMMARY OF THE INVENTION

The present invention provides an information retrieval engine capable of retrieving information about an unknown signal. In one embodiment, the unknown signal is an unknown audio signal such as a song and the information is tag information that should be associated with the unknown audio signal. The tag information can be retrieved even for unknown songs that have been trimmed or compressed. The present invention can be used to retrieve the tag information accurately and efficiently. Thus, the present invention overcomes the problem of linear searching and difficulties due to compression and trimming.

The information is retrieved by converting analog signals into sequences of symbols that represent the original analog signal. The conversion to symbolic representation is designed to be robust with respect to commonly occurring transformations such as small time shifts and volume changes. The symbolic representation of each signal is further transformed by considering the symbols representing the signal as analogically equivalent to letters in normal text and then grouping the symbols that represent a signal into the analogical equivalent of words and then grouping the words into documents.

A quantization technique is applied to obtain clusters in the space of spectral representations of the signal and then proximity of a signal to a cluster is taken as indicating the occurrence of the symbol corresponding to that cluster. By suitable design of the feature extraction done prior to clustering, it is possible to cluster such that the clusters formed from an uncompressed signal are not significantly different from the clusters formed from the same signal after it has been compressed. A technique called indexing is used to retrieve the tag information based on the words included in the unknown signal. This indexing operation is essentially similar to that performed in conventional text retrieval engines and thus can make use of an extensive technology in that area.

Indexing involves building a data structure that relates individual words made up of a sequence of symbols to the known signals that contain those words. The tags for each known signal is also stored in association with the known signal. Each known signal may be broken into multiple documents in which case the index relates words back to the documents in which they occur and then relates documents back to the signals in which they occur. To create an index, each known signal is first converted into symbolic representation, sequences of symbols are grouped into words and then sequences of words are converted into documents which may actually overlap. The index from words to documents and from documents to signals is then updated to represent the occurrence of each word and each document.

In order to search for an unknown signal using an index, the unknown signal is first converted into a sequence of symbols, words and documents in exactly the same fashion as was done with the known signals. The index is then used to find all documents that contain any of the words in the unknown signal. Scores are accumulated for all documents that are part of a known signal and that share any word with the unknown signal. There are many methods that are known in the text retrieval literature for scoring documents. The signal corresponding to the documents with the highest score is then considered to be the same signal as the unknown signal. In one embodiment, the tag information for that known signal is retrieved and associated with the unknown signal. The known and unknown signals need not represent audio signals, but merely need to be signals for which a useful quantization operation exists that is invariant with respect to the transformations that might be expected to be encountered.

As can be seen from the above description, the present invention may be applied to many different domains, and is not limited to the application of retrieval of information corresponding to audio signals. In addition, information retrieval according to the techniques of the present invention is not limited to the retrieval of tag information for music songs. Many techniques of the present invention may be applied to retrieval of information in other domains.

DETAILED DESCRIPTION OF THE PREFERRED EMBODIMENTS

The following description of preferred embodiments of the present invention is presented in the context of an information retrieval engine for music tracks, such as may be implemented in an Internet-based jukebox or personalized radio station. One skilled in the art will recognize that the present invention may be implemented in many other domains and environments, both within the context of musical information retrieval, and in other contexts. Accordingly, the following description, while intended to be illustrative of a particular implementation, is not intended to limit the scope of the present invention or its applicability to other domains and environments. Rather, the scope of the present invention is limited and defined solely by the claims.

Figure 1:
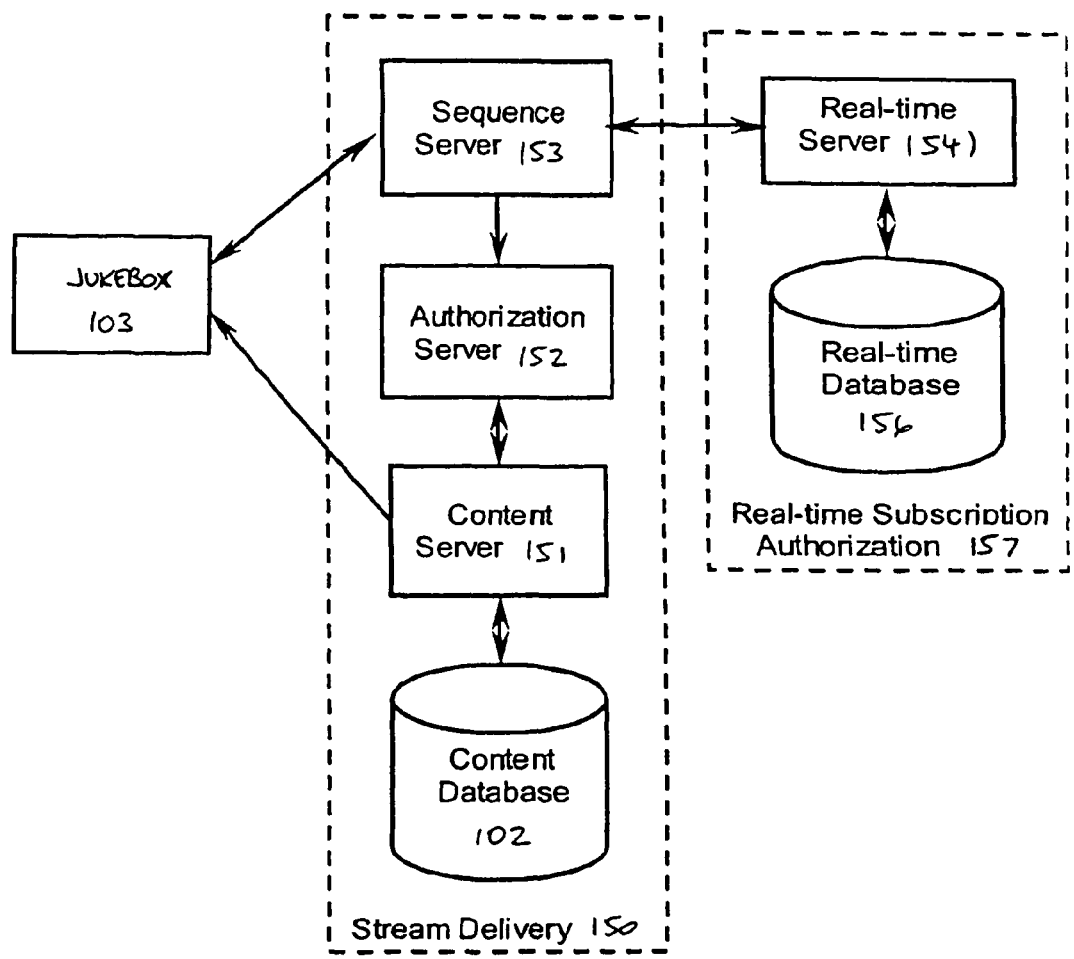
FIG. 1 is a block diagram of a functional architecture for one embodiment of the present invention.

Referring now to FIG. 1, there is shown a conceptual architecture of one embodiment of the present invention. In the architecture of FIG. 1, the invention is implemented in connection with a web-based "jukebox" 103, or personalized radio station, which accepts a user's selections of music tracks. The user is able to search for particular tracks and/or artists, and to control the playback of selected tracks. The user is also able to download tracks from other places on the Internet. Some of those tracks may not include tag information. Thus, the information retrieval engine of the present invention is employed to retrieve the unknown tag information. In one embodiment of the present invention, it is desirable to be able to retrieve the tag information from unknown music tracks so that an Internet radio station can be personalized or so that a server can make appropriate recommendations for music to purchase or to download.

In one embodiment, the system monitors the user's behavior with regard to searching, listening, and playback control in order to refine recommendations. Advertising, offers, and other information may be selected and presented to the user based on observations of user behavior and analysis as to which material may be of interest to the user. Thus, in this embodiment, it is useful to retrieve tag information for any unknown music tracks.

Stream delivery system 150 interacts with jukebox 103 to specify a sequence of audio files to deliver to jukebox 103. System 150 also delivers the audio files. Stream delivery system 150 also communicates with real-time subscription authorization module 157, which includes real-time server 154 and database server 156 that keeps track of which user accounts are active and enforces global business rules about which accounts can listen to the radio at a given time. Within stream delivery system 150, there are a number of distinct software entities. These include sequence server 153, authorization server 152, and content server 151. Sequence server 153 selects which files to play according to estimated listener preferences as well as pre-determined station formats. Authorization server 152 keeps a record of the files that are selected by sequence server 153 and is consulted by content server 151 when files are requested. If jukebox 103 requests files without the necessary security information or in an unexpected order, authorization server 152 flags this anomaly and content server 151 declines to provide the data.

Content database 102 contains descriptions of music tracks, and in one embodiment contains digitized representations of the music tracks themselves. Content database 102 is stored using conventional database storage means, and in one embodiment includes several fields providing descriptive information regarding music tracks, such as title, album, artist, type of music, track length, year, record label, and the like. For tracks without tag information, this descriptive information is retrieved using the information retrieval engine 160.

Figure 2:
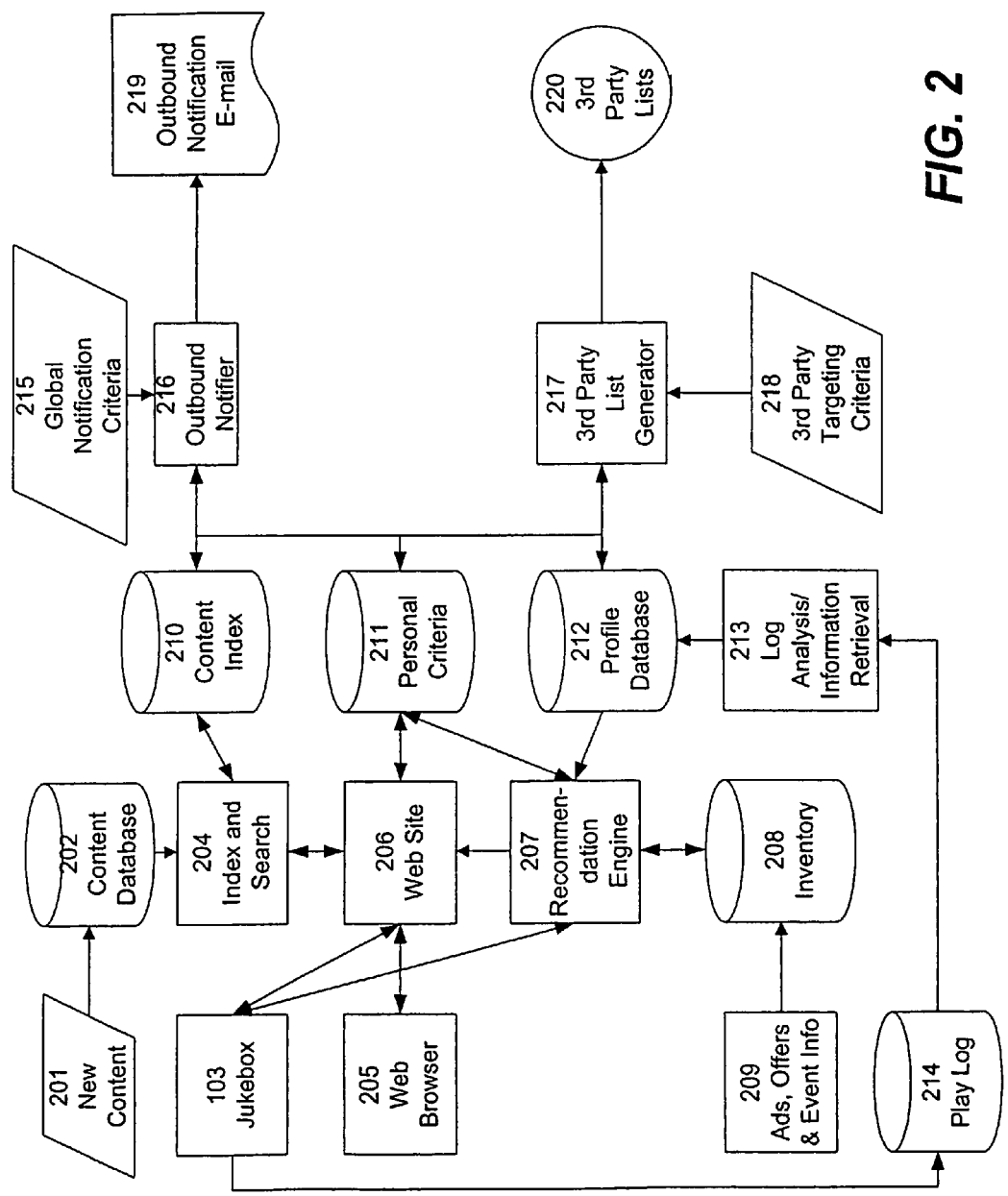
FIG. 2 is a block diagram of a conceptual architecture for one embodiment of the present invention.

Referring now to FIG. 2, there is shown a block diagram of a functional architecture for one embodiment of the present invention. Content index 210 provides a concise index of content stored in database 202, and is generated by conventional database generation means, to enable more efficient searching and updating of database 202.

Index and search module 204 facilitates functionality for accepting user input and searching database 202 for particular music tracks. In one embodiment, the user enters input by accessing web site 206, which provides an interactive user interface for accessing the functions of the present invention. Web site 206 provides the main point of contact with users. A user interacts with web site 206 over a network, using a conventional web browser 205 (such as Microsoft Internet Explorer), running on a client computer. Module 204 accesses database 202 and index 210 in response to user queries. Results are returned to the user via web site 206. In one embodiment, index and search module 204 also dynamically updates content index 210 in order to provide improved efficiency for future searches. Such indexing techniques are well known in the art.

In addition, web site 206 offers the capability for suggesting tracks and artists that may interest the user, based on personal criteria 211, profiles 212, of track-level discovered relationships based on observed user listening behavior determined by log analysis and information retrieval 213 of play logs 214, as described in more detail below. Log analysis and information retrieval 213 also retrieves tag information for unknown songs using the information retrieval engine of the present invention.

Play log 214 is a database that monitors and stores information describing user behavior. Specifically, the user's interaction with jukebox 103, including track selection, repeats, aborts and skips, and the like, are recorded and stored in play log 214. Log analysis and information retrieval module 213 analyzes play log 214 in order to generate a profile of the user, which is stored in profile database 212. Log analysis and information retrieval module 213 also retrieves tag information in accordance with the present invention. The retrieved tag information is stored in play log 214 for unidentified tracks. Log analysis and information retrieval module 213 periodically updates the play log 214 as the information about unknown music tracks is retrieved. In one embodiment, the tag information is retrieved by the information retrieval engine module 213 prior to log analysis in the log analysis module 213.

Figure 3:
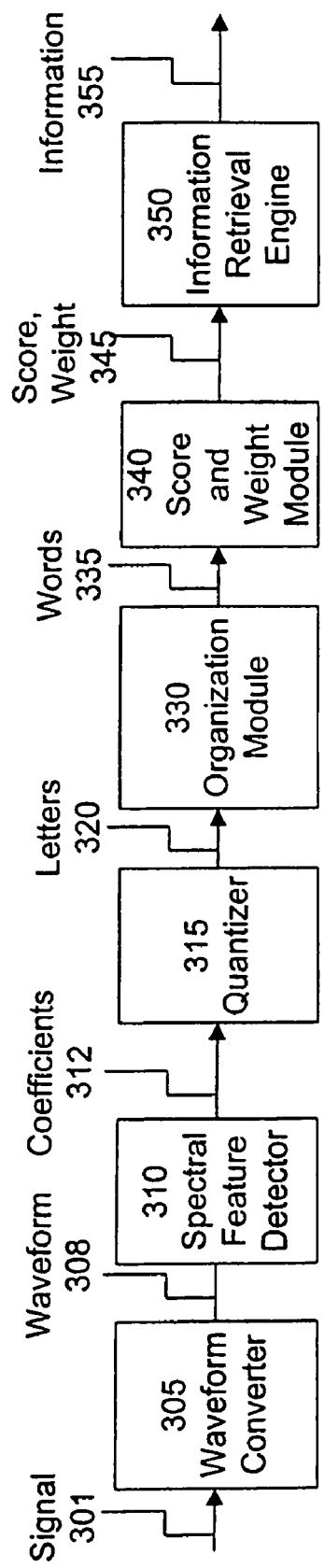
FIG. 3 is a block diagram of a functional architecture for information retrieval.

Now referring to FIG. 3, there is shown an overview block diagram according to the present invention. In FIG. 3, an unknown signal 301 is identified. The unknown signal can be an entire song, a trimmed portion of an entire song, a compressed version of an entire song, a compressed version of a trimmed portion of an entire song, or any other version of a song. The music 301 may be in any recognizable format, for example, MP3, MP2, M3U, ASX, ASF, PLS, WMA, WM, WMX, WAV, AVI, QT, CDA, MPG, MPEG, MPV2, MP2V, or MPA.

Waveform converter 305 converts signal 301 to a waveform 308. The waveform 308 is an alternate representation of the signal 301 input into the waveform converter 305. The waveform 308 is input into a spectral feature detector 310. The spectral feature detector detects spectral features 312 of the waveform 308.

The spectral feature detector first converts the signal from audio to Mel Spectral. Mel is a nonlinear frequency scale that matches human frequency discriminatory capabilities. The spectral feature detector then performs another transformation from Mel Spectral to Mel Cepstral as described in "Mel-Frequency Cepstral Analysis," by Unjung Nam available on the Internet at http://ccrma-www.stanford.edu/~unjung/mylec/mfcc.html. In one embodiment, Mel Cepstral is represented in terms of multiple coefficients 312. A first coefficient 312 encodes amplitude, a second coefficient 312 encodes fundamental frequency, and a subsequent coefficients 312 encodes successively refined aspects of overall spectral shape. The coefficients 312 are then quantized, by quantizer 315, using any one of several quantization techniques. The quantization techniques are described below in reference to FIG. 5.

The quantizer 315 outputs a symbol that represents an approximation of the signal 301 characteristics for a short period of time. These symbols are referred to here as letters. The sequence of letters 320 reflects the time evolution of the signal as it changes to be more or less like the clusters centroids. Because they are ordered and taken from a reasonably small vocabulary, these symbols can be analogized to letters in the textual domain. Therefore, in this application the terms symbols, clusters, and letters will be used interchangeably. The letters 320 are grouped into groups of one or more letters 320 by reference to a dictionary of letter groups that is created by examination of the frequencies of all letter groups in a large training set of signal inputs. These groups of letters are termed words, again following an analogy to the textual domain where the letters may be actual letters and the words actual words. The organization module 330 uses an algorithm described below with reference to FIG. 8 to determine a set of words or dictionary of letter groups 335.

The words 335 are then used to access an index. An index records all of the documents that contain particular words. By examining all index entries for the words in the words 335, all of the documents that have one or more words in common with the words 335 can be found. The known signals used to create the index are temporally separated into sections called documents. Each document is quantized and organized into words which are then indexed so that there is an entry for each unique word in any known signal. The index can thus be searched for words in the unknown signal 301. Every indexed document containing a word in common with the unknown signal 301 is scored in the score and weight module 340. Every word in the unknown signal 301 is weighted in the score and weight module 340. Scoring and weighting algorithms are described in detail below in reference to FIG. 10. Scores and weights 345 are output from the score and weight module. The score 345 is used to select a known signal and the tag information 355 associated with that known signal is then ascribed to the the unknown signal 301.

The information retrieval engine according to the present invention can determine the tag information for unknown music tracks that have been compressed or otherwise distorted in a fashion that leaves them psycho-acoustically similar to the original. By using quantization techniques and an index of quantized known tag information, tag information can be determined quickly and efficiently. The invention divides signals into documents, so that the known signal is broken down into smaller sections, documents, allowing the information retrieval engine to retrieve information for trimmed signals. One property of the quantization used in this embodiment is that the quantization of a compressed signal and the quantization of the same signal prior to compression are similar because the comparison operation that underlies the quantization process is designed to place psycho-acoustically similar signals near each other. Thus, a quantization technique allows the information retrieval engine to retrieve information for compressed signals.

Figure 4:
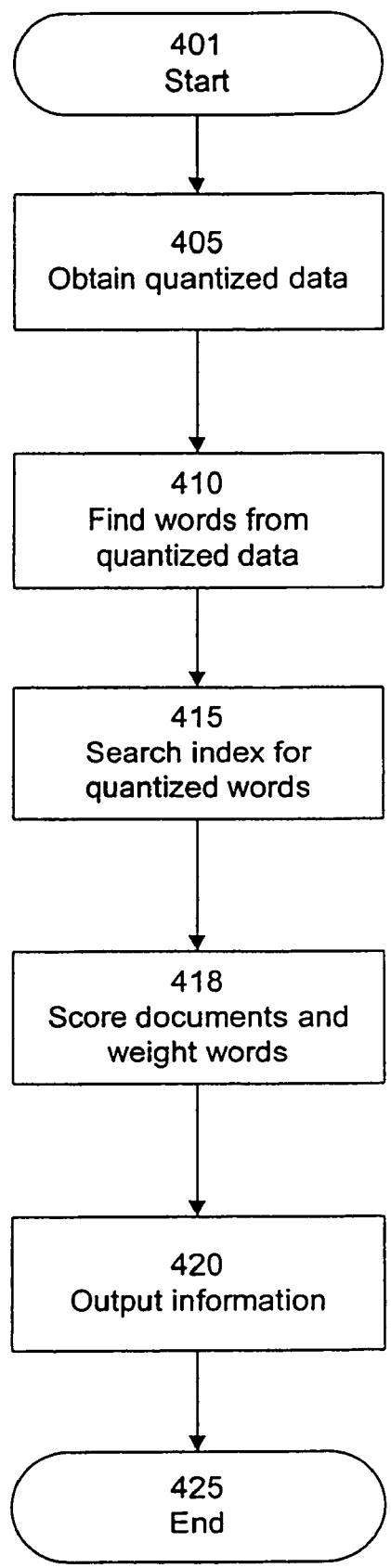
FIG. 4 is a flow diagram of a method of information retrieval.

Now referring to FIG. 4, there is shown a flow chart of the method of determining tag information. In one embodiment, a signal is converted to a waveform and the spectral features determined as described above, before the steps of FIG. 4 are performed. The spectral features are quantized 405 by quantizer 315 to obtain letters 405. The letters are grouped to form words 410 by organization module 330. Documents in an existing index are searched for the unknown words 415. An existing index is a database including known signals and their corresponding tags. The known signals are analyzed to recognize spectral features and their corresponding quantized representation exactly as is the unknown signal. The letters for the known signals are grouped into words and words are stored in the index with a pointer back to the original known signal. The unknown words are weighted 418 by score and weight module 340. Indexed documents are scored 418 by score and weight module 340. The scoring is based on the number of words in the unknown signal appearing in each segment of the known signals according to an algorithm described in detail below in reference to FIG. 10. The information for the known signal achieving the highest score is associated with the unknown signal. The information for the known signal achieving the highest score is output 420 by information retrieval engine 350.

Figure 5:
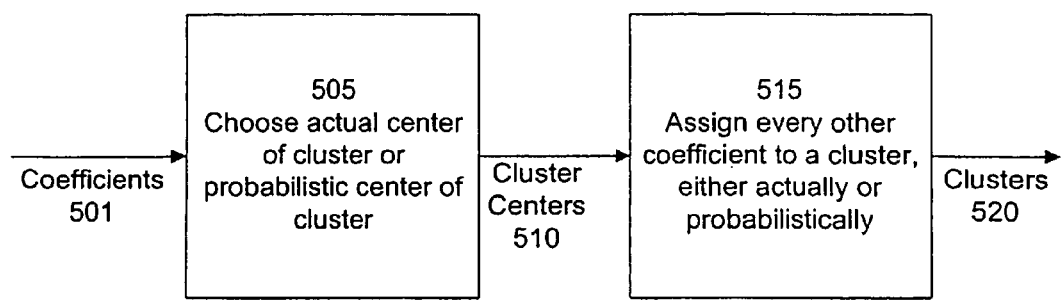
FIG. 5 is a block diagram of a functional architecture for quantization.

Now referring to FIG. 5, there is shown a block diagram of some examples of clustering techniques. Clustering is a process of associating groups of instances that are similar. Since the process of clustering groups instances that are similar and since similarity is defined in this embodiment by extracting spectral features that reflect human auditory perception, the clustering process will tend to group together signals that sound similar to a human listener. This property provides robustness to the system relative to distortions and compression algorithms that are psychoacoustically transparent. This property thus allows information retrieval when the unknown signal is compressed. By noting the successive clusters that are close to successive parts of a signal, the signal can be translated to a sequence of discrete symbols, referred to here as letters. There are several different clustering techniques. In one embodiment, any clustering technique can be used such that the desired result of obtaining letters is achieved. Clustering techniques include, for example: "k-means", incremental clustering, EM, and Gaussian mixtures.

Sets of coefficients representing spectral features are called input instances 501 and are clustered in one embodiment using the k as follows. First, a cluster centroid is chosen 505. Then, each cluster is built around the cluster centroids 510. Finally, the clusters are refined in some fashion. In one embodiment, the cluster centroids 510 are initially chosen at random. In one embodiment, the cluster centroids 510 are chosen by selecting an input instance as the initial value for each cluster centroid. Every instance is assigned to a cluster 515. In one embodiment, the instances 501 are assigned to the cluster 520 to which they are most proximal.

In one embodiment, the clustering groups are exclusive such that any instance belongs to only one group. In another embodiment, the clustering groups are overlapping such that one instance could belong to two groups.

In one embodiment, "k-means" clustering is used. In "k-means" clustering, the number of clusters sought is specified, k. Then points are chosen at random for cluster centroids. Each instance is assigned its closest cluster based on distance. The mean of all instances in each cluster is calculated. For each cluster, the mean of instances assigned to that cluster is considered to be the new cluster centroid and the process is repeated iteratively. Iteration can continue until the instances are assigned to the same clusters in consecutive iterations or until the error between consecutive iterations is sufficiently small, or until some other threshold is reached. One skilled in the art will note that there are many variants of clustering that could be used interchangeably with k-means clustering. Such variants as Gaussian mixtures, Expectation-Maximization, hierarchical clustering and so on are well known in the art.

Figure 6:
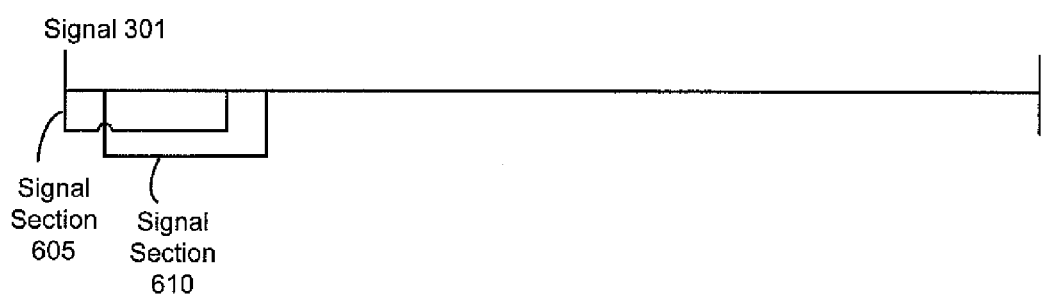
FIG. 6 is a diagram of a signal broken into documents.

Now referring to FIG. 6, there is shown a diagram of the segments of signals. Prior to building an index of known signals and their associated information and words, the signals, such as signal 301 shown in FIG. 6, are separated into sections, such as sections 605 and 610 of signal 301, called documents. The sections can be of any length that provides accurate results for tag identification. In one embodiment of the present invention, the documents are 30 seconds long. Each document contains 30 seconds of the song.

In one embodiment of the present invention, the documents are overlapping. Any amount of overlap, or no overlap, can be used. In one embodiment of the present invention, the document overlap is 20 seconds. In an alternative embodiment, the document overlap is 15 seconds.

Known signals are broken into documents to provide smaller sections of the signal to group into words. The documents also aid in signal identification if a signal has been trimmed. If an unknown signal is only a 30-second segment out of a 4-minute signal, the unknown signal may not be identified if the entire known signal is scored. However, by breaking down the known signals into documents, the unknown signal is more likely to be identified.

It is also possible that the unknown signal is 30 seconds long, however it is not the first 30 seconds of the signal or the second 30 seconds, etc. It could be, for example, the 30 seconds that occurs from 7 seconds into the signal until 37 seconds into the signal. In this case, if there were no overlap at all between the documents, the unknown signal may also be hard to identify because it does not correspond in time to one of the known documents. However, if the known documents overlapped by either 5 or 10 seconds, the unknown signal would be easily identifiable because it would correspond closely in time to a known signal document.

If an unknown signal is longer than the predetermined length of a known document, the unknown song is itself separated into documents. In one embodiment, the documents of the unknown signal are the same length as the documents of the known signals. Also, the overlap of the documents of the unknown song are usually the same as the documents of the known songs, though this is not necessary to practice the present invention.

Figure 7:
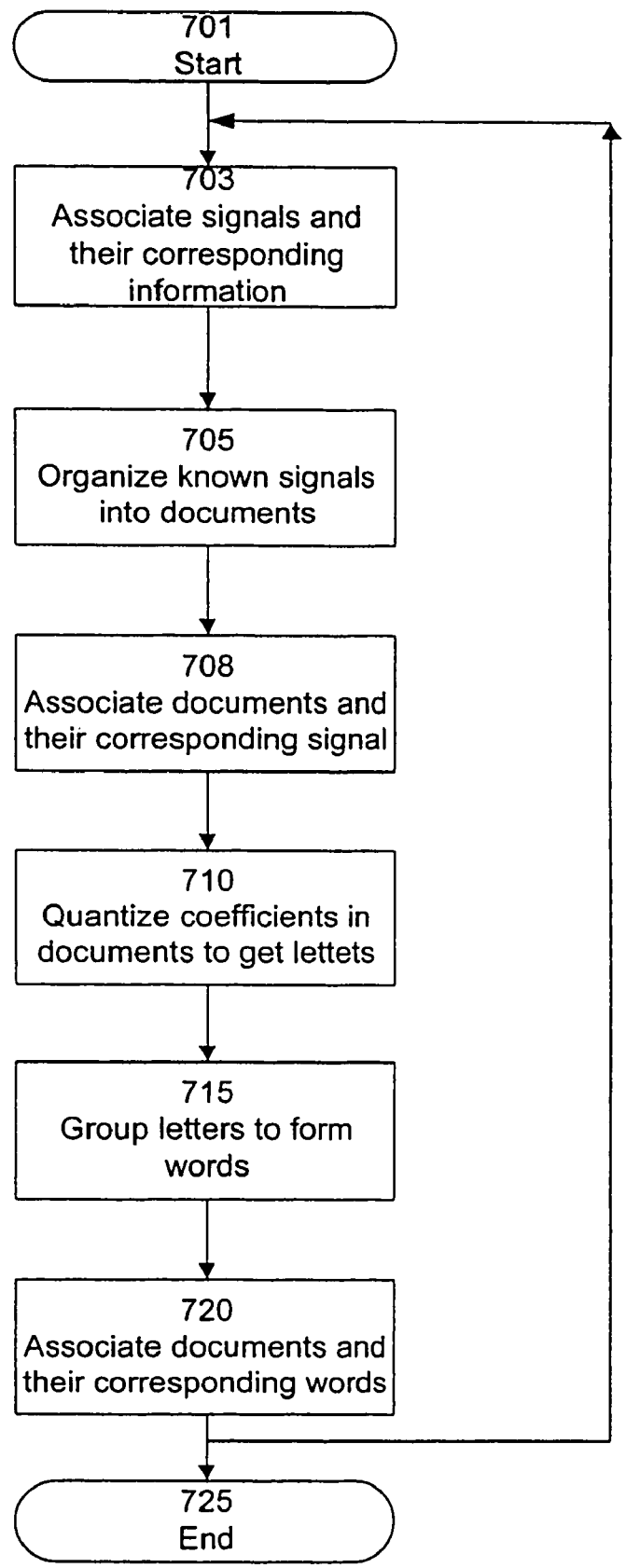
FIG. 7 is a flow diagram of a method of indexing.

Now referring to FIG. 7, there is shown a flow chart of a method of building an index of known signals. The index of known songs is used to retrieve information about an unknown signal. To build an index, a signal for which the information is available, a known signal, is input into the index. In one embodiment, a database is used to store the known signal and its corresponding tag information 703. The known signal is sectioned into documents 705. The documents are further described above in reference to FIG. 6. In one embodiment, a database is used to keep track of the documents associated with the known signal 708.

The signal for each document is converted into its corresponding waveform and the spectral features of the waveform are detected as described above in reference to FIG. 3. The coefficients are then quantized 710 using one of the above described techniques. When the coefficients have been quantized 710, clusters of data are output, representing the original audio signal. These clusters are referred to as letters.

The letters are grouped together to form words 715. A word is a group of one or more letters. Words are formed based on the frequency of the groups of letters. If a letter or group of letters appears within certain threshold frequency limits, then the letter or group of letters are organized to form words. The formation of words is described in further detail below with reference to FIG. 8.

In one embodiment, the database also associates the documents and their corresponding words 720. This method is repeated for as many known signals as is desirable to enter into the index. In one embodiment of the present invention, an index can be built that contains every signal currently known. In an alternative embodiment, an index can be built that in some way classifies the signals so that it does not contain every known signal, but instead contains a subset of every known signal. The classification could be based on any criteria as long as it is a plausible design.

Once an index has been built it can be used to identify an unknown signal. The unknown signal can also be broken into documents, quantized, and grouped into words. In one embodiment of the present invention, the words in the unknown documents can be compared to the words in the known documents in order to find a match and identify an unknown piece of music by its tag information.

Figure 8:
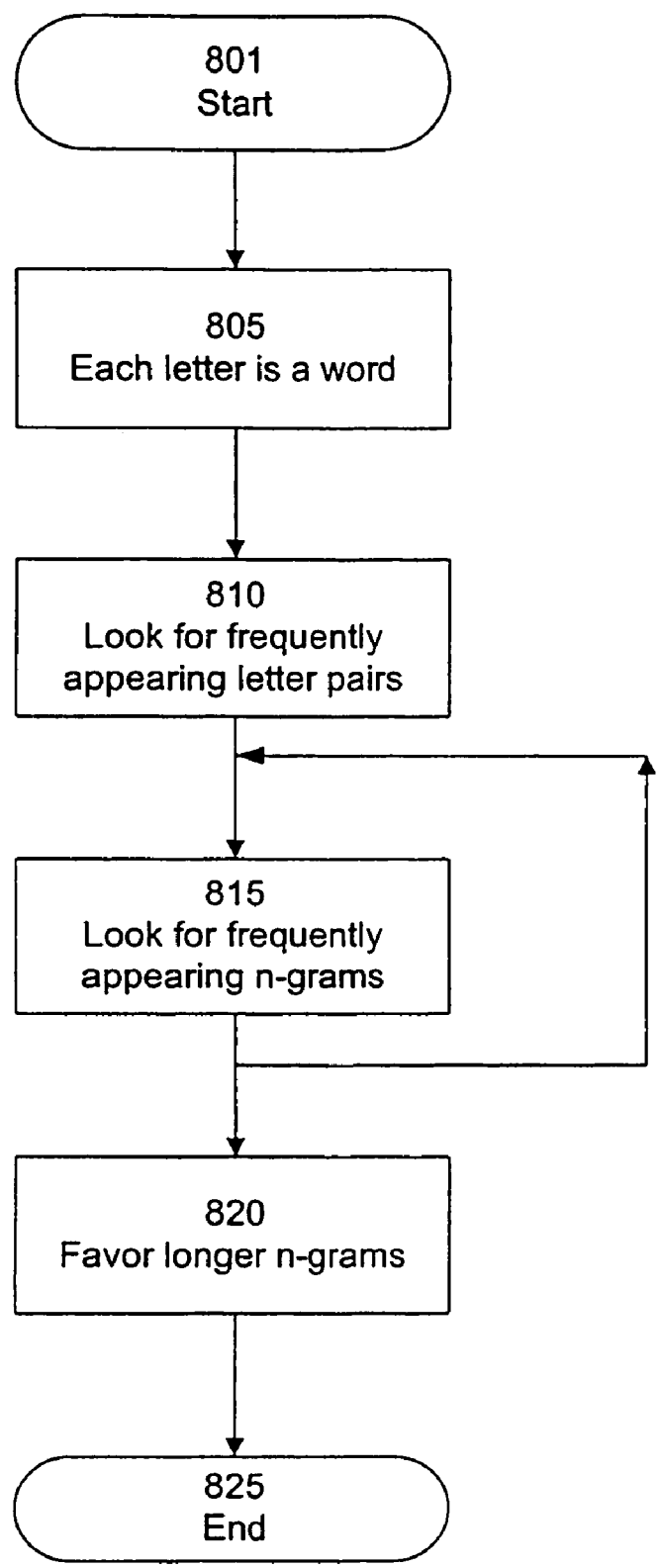
FIG. 8 is a flow diagram of a method of grouping letters to form words.

Now referring to FIG. 8, there is shown a method of forming a word from letters. Words are formed from a series of letters in a given document. In one embodiment, there are two thresholds that together define whether a word is considered "frequently appearing" in each document. The threshold values are chosen such that the words yield an accurate, fast, and memory-efficient result of identifying an unknown signal. The first threshold is a minimum number of appearances of a word in a document. The first threshold is referred to as $t_1$. In one embodiment, the second threshold is a maximum number of appearances of a word in a document. The second threshold is referred to as $t_2$. A word is considered to be "frequently appearing" if its frequency lies between the thresholds. In an alternate embodiment, only one of the two thresholds is used.

When words are formed, initially, each letter is assumed to be a word 805. Then, in one embodiment of the present invention, the system looks for pairs of frequently appearing letters 810. These are also considered words. In one embodiment, the system then looks for frequently appearing 3-grams 815 (a three letter word). In one embodiment, the system then looks for frequently appearing 4-grams 815. Finally, the system looks for frequently appearing n-grams 815, where n is any positive integer value greater than 2. In the event of overlap between a 2-gram and any n-gram, the system favors the longer word 825. The result is a series of the longest frequently appearing n-grams.

The following is a hypothetical example of word formation for an arbitrary string of letters from the alphabet.

agecqrtlmsdsplcqragetlprageslrpsas

Assume for this hypothetical example that the lower threshold $t_1$ is 2 and the upper threshold $t_2$ is 4. Each letter is assumed to be a word 805. The letter pair "ag" appears 3 times, making it a frequently appearing word 810, according to the threshold values. The 3-gram, "age," appears 3 times making it a frequently appearing word 815. There is no letter that could be added to "age" to form a frequently appearing 4-gram. The words "agec," "aget," and "ages" each only appear once. Therefore no more letters should be added and the 3-gram "age" is the longest n-gram that can be formed to meet the frequently appearing word criteria. The same process could be performed on the second letter in the string, "g." However, since "ge" overlaps with "age", the "ge" word would be eliminated when favoring longer words 820.

The same process could be performed to form the word "cqr" as to form the word "age." After the system finished forming words on this string the following words would be formed: "age" appearing 2 times, "cqr" appearing 2 times, "tl" appearing 2 times, "s" appearing 4 times, "p" appearing 3 times, "l" appearing 2 times, and "r" appearing 2 times.

Figure 9:
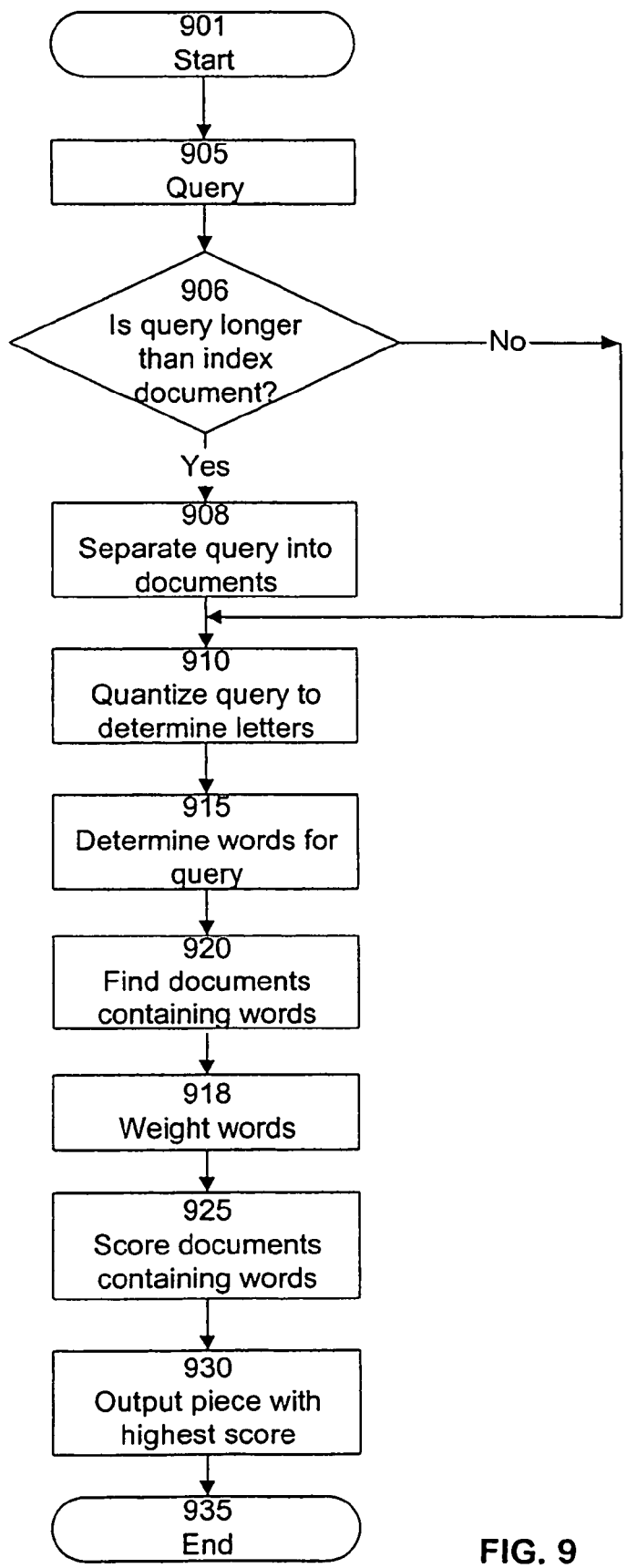
FIG. 9 is a flow diagram of a method of information retrieval using an index.

Now referring to FIG. 9, there is shown a flow diagram of a method for information retrieval. In one embodiment of the present invention, the information retrieved is tag information identifying a music track. In one embodiment of the present invention, the information retrieval engine 350 receives an unidentified signal, a query 905. The query comprises an unknown signal. The information retrieval engine 350 uses a previously built index to identify the unknown signal. The information engine determines whether or not the query is longer than the document length used when the index was built 905. If the query is longer than the length of the documents used when the index was built 906, then the query is divided into documents 908 as described above with reference to FIG. 6.

Each document of the query, or the entire query if it was not divided into documents, is quantized 910. Any technique of quantization can be used. Several techniques of quantization are described above with reference to FIG. 5. Words are formed out of the quantized letters for each document in the query 915. Each word in the query is weighted 918. The weights are described further below with reference to FIG. 10. For each word in each document of the query, the known documents containing those words are located 920. The known documents containing those query words are scored 925. The scoring is also described further below in reference to FIG. 10. The documents with the highest scores are considered the same as the query documents or the unknown signal. The information retrieval engine consults the database to identify a signal corresponding to the documents with the highest score, and outputs that information 930. The tag information for the signal with the highest score is output as the tag information for the query or unknown signal.

In one embodiment, the present invention employs a binomial log likelihood ratio analysis for weighting and scoring words in the query and known documents in the index. The log likelihood ratio is a measure of how well a null hypothesis fits the observed data. If the null hypothesis is the assumed independence of occurrence of a word in the query and a word in a known document, for example, the log likelihood ratio measures the likelihood that such independence is a valid assumption. It follows, then, that the log likelihood ratio is a useful indicator of the relationship between the occurrences of the two words, if any.

The log likelihood ratio is based on a likelihood ratio. A likelihood ratio is the ratio of the maximum likelihood of the observed data for all models where the null hypothesis holds to the maximum likelihood of the observed data for all models where the null hypothesis may or may not hold. The log likelihood ratio is the logarithm of the likelihood ratio.

For the present invention, the log likelihood ratio is employed to determine whether a given word is more likely to appear in a first known document than in a second known document. Based on this measure, subsets of documents are defined so as to identify those documents most likely to contain the query words.

In one embodiment, the log likelihood ratio is applied in the present invention to determine whether a particular track occurs more frequently than expected in the selections of a subset of users. Variables are defined as follows:

N=the total number of users;
k(w)=the number of words in each document;
i=document
j=word The following equations are applied:

$$\prod_{ij} \frac{k_{ij}}{N_j}, \mu_j = \sum_i \frac{k_{ij}}{N}$$

The log likelihood ratio is then given as:

$$LLR \text{ for the track} = \sum k_{ij} \log \frac{\prod_{ij}}{\mu_j}$$

Figure 10:
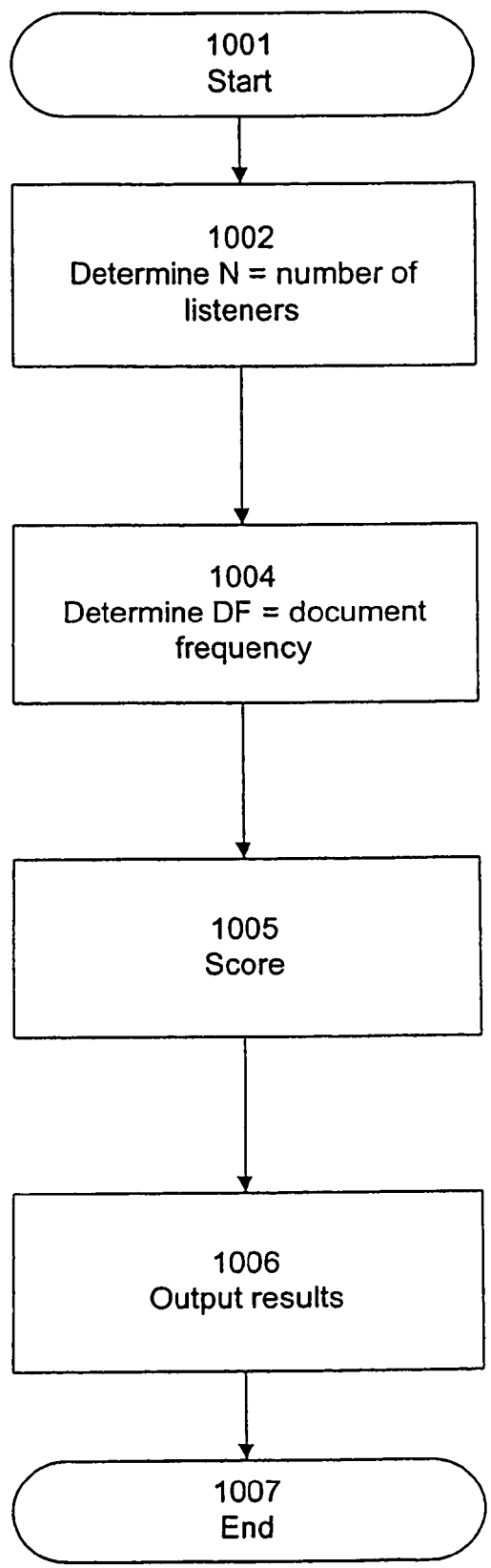
FIG. 10 is a flow diagram of a method of scoring documents and queries using the present invention.

Referring now to FIG. 10, there is shown a flow diagram of a method of weighting words and scoring documents according to the present invention. The method illustrated in FIG. 10 is shown in terms of matching words in an information retrieval system. One skilled in the art will recognize that the method may be adapted and applied to many other domains and techniques.

A total number of documents N is determined 1002. The system determines a document frequency (the number of times document occurred, or $$DF_j = \sum (k_{ij} > 0))1004.$$

The results are weighted according to a product of up to three components: l=the number of times a word appears in the query document(s); g=the number of times a word appears in the known documents; and n=a normalizing factor based on how many words there are, in total 1005.

The first weighting factor, l, is a local weighting factor. It represents the frequency of the word within the query document. It may be represented and defined according to the following alternatives:

$l_T = k_{ij}$ =Number of words in the query; or
$l_L = \log k_{ij}$ (or $\log(k_{ij}+1)$ ); or
$l_X = 1$ (a constant, used if this weighting factor is not to be considered).

l may be adjusted.

The second weighting factor, g, represents the frequency of the words within all the known documents. It may be represented and defined according to the following alternatives:

$$g_I = \log \frac{N+1}{DF_j + 1}$$

(inverse document frequency, i.e., the log of the total number of documents divided by the document frequency); or $g_x = 1$ (a constant, used if this weighting factor is not to be considered).

g may be adjusted in a similar manner as is l.

The third weighting factor, n, represents a normalizing factor, which serves to reduce the bias for scoring long documents higher than short ones. Using a normalizing factor, a short relevant document should score at least as well as a longer document with general relevance. n may be represented and defined according to the following alternatives:

$$n_c = \frac{1}{\sqrt{\sum_j (l_j)^2 (g_{ij})^2}}; \text{ or}$$

$n_X = 1$ (a constant, used if this weighting factor is not to be considered).

By employing the above-described combination of three weighting factors in generating weights for words and scores for documents, the present invention avoids the problems of overstating frequently appearing words and overstating coincidental co-occurrence. If a word is frequently occurring, the second weighting factor will tend to diminish its overpowering effect. In addition, the effect of coincidental co-occurrence is lessened by the normalization factor.

In one embodiment, the system of the present invention generates scores as follows. For each track of interest, a large N-dimensional vector is determined. For each known document, a large N-dimensional vector is determined. The techniques of assigning meaning to such vectors and training the vector set to represent similarities among vectors are well known in the art, as described for example in Caid et al., U.S. Pat. No. 5,619,709, for "System and method of context vector generation and retrieval."

A score can be generated for one or more documents, and the highest-scoring document is treated as if it is the same as the query document. A score for a document is determined by taking the dot product of the query vector and the document vector. In one embodiment of the present invention, the above-described weighting factors are applied to the vector terms in order to improve the results of the scoring process.

The words are weighted using the general formula $l_{ij}g_jn_i$, where l, g, n are defined above 1005. The known documents are scored using the general formula $l_{ij}g_jn_i$, where l, g, n are defined above 1005. The specific options can be chosen based on the desired results. In one embodiment of the present invention, it is desired to preserve diversity, to give rarity a bonus, and to normalize. In that embodiment, the weighting options L, I, and C may be chosen. Weighting option L acts to preserve diversity, option I acts to give variety a bonus, and C acts to normalize the results. Thus, in that embodiment the weighting would be equal to $l_Lg_In_C$. In other embodiments, different weighting options can be used. In one embodiment, the present invention uses the same weighting for the query words as it does for scoring the known documents. In an alternative embodiment, different weighting options can be chosen for the query words and for scoring the known documents.

Once the query has been weighted and the known documents have been scored and the dot product of two vectors determined, the document or documents with the highest score are determined. The highest scoring documents are then looked up in the database to determine the corresponding signal. The corresponding signal is considered to be the query signal. Thus, the present invention has identified the unknown signal using the information retrieval engine. The information for the unknown signal is the same as the information for the corresponding signal in the index. In one embodiment, the present invention associates the information with the unknown signal. In one embodiment, the present invention outputs the information to a user of the information engine 1006.

From the above description, it will be apparent that the invention disclosed herein provides a novel and advantageous system and method for information retrieval. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where information retrieval is desirable. Accordingly, the disclosure of the present invention is intended to illustrative, but not limiting, of the scope of the invention, which is set forth in the following claims.

What is claimed is:

1. A computer-implemented method comprising:
   accepting, by at least one processing unit, a file and information corresponding to the file, the file comprising content and the information corresponding to the file comprising metadata;
   associating, by the at least one processing unit, the file and the information corresponding to the file;

organizing, by the at least one processing unit, the file to form at least one document comprising at least a portion of the content of the file;

associating, by the at least one processing unit, the file and the document corresponding to the file;

quantizing, by the at least one processing unit, the document's content to obtain letters;

grouping, by the at least one processing unit, the letters to form a set of words, the set being based on predetermined frequency of occurrence threshold and frequencies of occurrence of words formed from the letters;

associating, by the at least one processing unit, each document and the corresponding set of words in an index of documents, the index corresponding to a plurality of files, including the accepted file, each file of the plurality having corresponding metadata and each file being organized to form at least one of the documents indexed, each document indexed having the set of words formed from the document's content;

obtaining, by the at least one processing unit, a set of query words formed from content of a query, the obtaining further comprises:

receiving the query;

quantizing the content of the query to output a series of letters;

grouping the letters to form the set of query words based on a predetermined frequency of the occurrence of the grouped letters; and weighting the query using a local weighting factor, a global weighting factor, and a normalization factor;

identifying, by the at least one processing unit, one or more documents in the index, each of the identified documents containing at least one query word in the set of query words;

scoring, by the at least one processing unit, each of the identified documents, a score for each identified document being based at least in part on a weighting of each query word found in the identified document, the weighting being determined using the local weighting factor and the global weighting factor; and selecting, by the at least one processing unit, the metadata of an identified file as metadata for the content of the query, the identified file being identified from the plurality of files using the identified documents' scores.

2. The computer-implemented method of claim 1, wherein the file is an audio file.

3. The computer-implemented method of claim 2, wherein the audio file is a song.

4. The computer implemented method of claim 2, wherein the audio file is a compressed song.

5. The computer-implemented method of claim 2, wherein the audio file is a portion of a song.

6. The computer-implemented method of claim 1, wherein the grouping the letters comprises:

searching for frequently appearing letters; and searching for frequently appearing n-grams, where n is any integer.

7. The computer-implemented method of claim 6, wherein the frequently is determined by predetermined threshold limits.

8. The computer-implemented method of claim 1, wherein the quantizing is performed using an Expectation-Maximization algorithm.

9. The computer-implemented method of claim 1, wherein the quantizing is performed using an incremental algorithm.

10. The computer-implemented method of claim 1, wherein the quantizing is performed using a Gaussian mixture algorithm.

11. The computer-implemented method of claim 1, the obtaining the set of query words further comprising separating the received query to form a plurality of documents.

12. The computer-implemented method of claim 11, wherein each of the plurality of formed documents and each document in the index is the same length.

13. The computer-implemented method of claim 11, wherein the length is thirty seconds in length.

14. The computer-implemented method of claim 13, wherein each one of the formed documents document overlaps with an adjacent one of the formed documents.

15. The computer-implemented method of claim 14, wherein the overlap comprises a twenty-five second overlap.

16. The computer-implemented method of claim 14, wherein the overlap comprises a fifteen-second overlap.

17. The computer-implemented method of claim 1, wherein the normalization factor is n c=1 j .times. (1 j) 2 .times. (g ij) 2, where l.sub.j represents the number of times a word appears in the query and g.sub.ij represents the number of times a word appears in the documents in the index.

18. The computer-implemented method of any of claims 1 and 17, wherein the local weighting factor is k.sub.ij, where k.sub.ij represents the number of query words in the set of query words.

19. The computer-implemented method of any of claims 1 and 17, wherein the local weighting factor is log k.sub.ij, where k.sub.ij represents the number of query words in the set of query words.

20. The computer-implemented method of any of claims 1 and 17, wherein the local weighting factor is one.

21. The computer-implemented method of any of claims 1 and 17, wherein the global weighting factor is log .times. N+1 DF j+1, wherein N represents the total number of documents and DF represents the document frequency.

22. The computer-implemented method of any of claims 1 and 17, wherein the global weighting factor is one.

23. The computer-implemented method of claim 1, wherein the scoring each of the identified documents further comprises scoring each of the identified documents using the normalization factor.

24. The computer-implemented method of claim 23, wherein the normalization factor is $$n_c = \frac{1}{\sqrt{\sum_j (l_j)^2 (g_{ij})^2}}$$

where $l_j$ represents the number of times a word appears in the query and $g_{ij}$ represents the number of times a word appears in the documents in the index.

25. The computer-implemented method of any one of claims 1, 23 and 24, wherein the local weighting factor is $k_{ij}$, where $k_{ij}$ represents the number of query words in the set of query words.

26. The computer-implemented method of any one of claims 1, 23 and 24, wherein the local weighting factor is log $k_{ij}$, where $k_{ij}$ represents the number of query words in the query.

27. The computer-implemented method of any one of claims 1, 23 and 24, wherein the local weighting factor is one.

28. The computer-implemented method of anyone of claims 1, 23 and 24, wherein the global weighting factor is $$\log \frac{N+1}{DF_j+1},$$

wherein N represents the total number of documents and DF represents the document frequency.

29. The computer-implemented method of anyone of claims 1, 23 and 24, wherein the global weighting factor is one.

30. The computer-implemented method claim 1, wherein the at least one document into which the file is organized comprises multiple documents having the same length.

31. The computer-implemented method of claim 30, wherein the length comprises thirty seconds.

32. The computer-implemented method of claim 30, wherein the at least one document comprises multiple documents each one of the multiple documents overlapping with another one of the multiple documents.

33. The computer-implemented method of claim 32, wherein the overlap comprises a twenty-five second overlap.

* * * * *